US010636751B2

(12) United States Patent
Hori et al.

(10) Patent No.: US 10,636,751 B2
(45) Date of Patent: Apr. 28, 2020

(54) SEMICONDUCTOR DEVICE INCLUDING CIRCUIT HAVING SECURITY FUNCTION

(71) Applicant: National Institute of Advanced Industrial Science and Technology, Tokyo (JP)

(72) Inventors: Yohei Hori, Tsukuba (JP); Yongxun Liu, Tsukuba (JP); Shinichi Ouchi, Tsukuba (JP); Tetsuji Yasuda, Tsukuba (JP); Meishoku Masahara, Tsukuba (JP); Toshifumi Irisawa, Tsukuba (JP); Kazuhiko Endo, Tsukuba (JP); Hiroyuki Ota, Tsukuba (JP); Tatsuro Maeda, Tsukuba (JP); Hanpei Koike, Tsukuba (JP); Yasuhiro Ogasahara, Tsukuba (JP); Toshihiro Katashita, Tsukuba (JP); Koichi Fukuda, Tsukuba (JP)

(73) Assignee: NATIONAL INSTITUTE OF ADVANCED INDUSTRIAL SCIENCE & TECHNOLOGY, Tokyo (JP)

( * ) Notice: Subject to any disclaimer, the term of this patent is extended or adjusted under 35 U.S.C. 154(b) by 124 days.

(21) Appl. No.: 15/750,614

(22) PCT Filed: Aug. 3, 2016

(86) PCT No.: PCT/JP2016/072806
§ 371 (c)(1),
(2) Date: Feb. 6, 2018

(87) PCT Pub. No.: WO2017/026350
PCT Pub. Date: Feb. 16, 2017

(65) Prior Publication Data
US 2019/0019766 A1    Jan. 17, 2019

(30) Foreign Application Priority Data

Aug. 10, 2015 (JP) ................................ 2015-158407

(51) Int. Cl.
*H01L 23/00* (2006.01)
*H01L 23/522* (2006.01)
(Continued)

(52) U.S. Cl.
CPC ............ *H01L 23/576* (2013.01); *H01L 21/82* (2013.01); *H01L 21/822* (2013.01);
(Continued)

(58) Field of Classification Search
CPC ..... H01L 23/576; H01L 21/82; H01L 21/822; H01L 23/522; H01L 25/0657; H01L 27/04; H01L 23/544; G11C 16/20
See application file for complete search history.

(56) References Cited

U.S. PATENT DOCUMENTS 5,668,022 A    9/1997 Cho et al.
8,274,306 B1   9/2012 Garcia
(Continued)

FOREIGN PATENT DOCUMENTS

JP    2005136301 A    5/2005
JP    2011198317 A   10/2011
(Continued)

OTHER PUBLICATIONS

Huang et al. "Counterfeit Electronics: A Rising Threat in the Semiconductor Manufacturing Industry", Sep. 2013, IEEE International Test Conference, pp. 1-4 (Year: 2013).*
(Continued)

*Primary Examiner* — Kenneth W Chang
(74) *Attorney, Agent, or Firm* — McCormick, Paulding & Huber PLLC (57) ABSTRACT

A semiconductor device 100 of the present invention includes a front end and back ends A and B, each including (Continued)

a plurality of layers. Further, in the plurality of layers of the back end B, (i) circuits 22, 23, and 24 having a security function are provided in at least one layer having a wiring pitch of 100 nm or more, (ii) a circuit having a security function is provided in at least one wiring layer in M5 or higher level (M5, M6, M7, . . . ), (iii) a circuit having a security function is provided in at least one layer, for which immersion ArF exposure does not need to be used, or (iv) a circuit having a security function is provided in at least one layer that is exposed by using an exposure wavelength of 200 nm or more.

16 Claims, 4 Drawing Sheets (51) Int. Cl.
| | | |
|---|---|---|
| *H01L 21/82* | (2006.01) | |
| *H01L 27/04* | (2006.01) | |
| *H01L 21/822* | (2006.01) | |
| *H01L 25/065* | (2006.01) | |
| *G11C 16/20* | (2006.01) | |
| *H01L 23/544* | (2006.01) | |

(52) U.S. Cl.
CPC ........ *H01L 23/522* (2013.01); *H01L 25/0657* (2013.01); *H01L 27/04* (2013.01); *G11C 16/20* (2013.01); *H01L 23/544* (2013.01)

(56) References Cited

U.S. PATENT DOCUMENTS

| | | | |
|---|---|---|---|
| 8,741,713 B2 | 6/2014 | Bruley et al. | |
| 2002/0042193 A1* | 4/2002 | Noguchi | ........... H01L 21/02074 438/618 |
| 2003/0137058 A1* | 7/2003 | Magerlein | .............. H05K 1/112 257/784 |
| 2005/0093160 A1 | 5/2005 | Otsuka | |
| 2007/0281465 A1 | 12/2007 | Otsuka | |
| 2008/0156987 A1* | 7/2008 | Barton | ................. G01N 1/2806 250/307 |
| 2009/0039520 A1 | 2/2009 | Tanaka et al. | |
| 2010/0006850 A1* | 1/2010 | Tyberg | ................ H01L 23/5226 257/66 |
| 2010/0044858 A1 | 2/2010 | Cohn et al. | |
| 2010/0308439 A1* | 12/2010 | Lee | ......................... G03F 7/203 257/618 |
| 2011/0079923 A1 | 4/2011 | Suh | |
| 2011/0079924 A1 | 4/2011 | Suh | |
| 2013/0047209 A1 | 2/2013 | Satoh et al. | |
| 2013/0127442 A1 | 5/2013 | Satoh et al. | |
| 2013/0234340 A1 | 9/2013 | Suh | |
| 2013/0277861 A1 | 10/2013 | Suh | |
| 2013/0280863 A1 | 10/2013 | Suh | |
| 2014/0042442 A1 | 2/2014 | Bruley et al. | |
| 2014/0162464 A1* | 6/2014 | Dimitrakopoulos | ........................ H01L 21/02225 438/761 |
| 2015/0084193 A1* | 3/2015 | Feng | ..................... H01L 23/535 257/741 |
| 2016/0330038 A1* | 11/2016 | Kim | ...................... H04L 9/3278 |

FOREIGN PATENT DOCUMENTS

| | | |
|---|---|---|
| JP | 2012033593 A | 2/2012 |
| JP | 2013507773 A | 3/2013 |
| KR | 101100125 B1 | 12/2011 |
| WO | 2011044385 A2 | 4/2011 |
| WO | 2014026011 A1 | 2/2014 |

OTHER PUBLICATIONS

Supplementary Partial European Search Report for Serial No. EP 16 83 5047 dated Dec. 4, 2018.
International Search Report for PCT Serial No. PCT/JP2016/072806 dated Sep. 20, 2016.
Chang-Hong Shen, et al. "Monolithic 3D Chip Integrated with 500ns NVM, 3ps Logic Circuits and SRAM", 9.3.1-9.3.4, Electron Devices Meeting (IEDM), 2013 IEEE International, Dec. 9-11, 2013.
Physical Unclonable Functions—Memory PUF—Hidehiro Fujiwara, Makoto Yabuuchi, Koji Nii Renesas Electronics Corporation and the English translation thereof.

* cited by examiner

| Layer | Pitch | CPU [5] | SoC |
|---|---|---|---|
| Gate | 70 nm | Gate | Gate |
| M0 | 56 nm | M0 | M0 |
| M1 | 70 nm | M1 | M1 |
| Metal 1x | 52 nm | M2 | M2/3/4/5 |
| Metal 1.1x | 56 nm | M3 | N/A |
| Metal 1.5x | 80 nm | M4 | 1-3 layers |
| Metal 2x | 100 nm | M5 | 1-2 layers |
| Metal 3x | 160 nm | M6-8 | 1-2 layers |
| Metal 5x | 252 nm | M9/M10 | 1-2 layers |
| Metal Top | 1080nm | M11 | Top Metal |
| TM1 | 14 um | TM1 | TM1 |

FIG. 4

| MINIMUM DIMENSION | LIGHT SOURCE FOR EXPOSURE | WAVELENGTH |
|---|---|---|
| 0.5 μm | HIGH PRESSURE MERCURY LAMP, g-RAY | 436nm |
| 0.35 μm | HIGH PRESSURE MERCURY LAMP, i-RAY | 357nm |
| 0.15 μm | KrF EXCIMER LASER | 248nm |
| 0.10 μm | ArF EXCIMER LASER | 193nm |

SEMICONDUCTOR DEVICE INCLUDING CIRCUIT HAVING SECURITY FUNCTION

CROSS-REFERENCE TO RELATED APPLICATIONS

This application is a National Stage application of International Patent Application No. PCT/JP2016/072806, filed on Aug. 3, 2016, which claims priority to Japanese Patent Application Number 2015-158407, filed on Aug. 10, 2015, each of which is hereby incorporated by reference in its entirety.

TECHNICAL FIELD

The present invention relates to a semiconductor device, and more particularly to a semiconductor device including a circuit having a security function.

Note that the "semiconductor device" used in the present specification means one device (element, IC chip, module or the like) made of semiconductor, and is used in similar meaning to such terms as "semiconductor circuit", "semiconductor integrated circuit", "semiconductor element" and others.

BACKGROUND ART

There is a request to incorporate some kind of security function such as device identification in a semiconductor device such as LSI, for discriminating an imitation (copy) product of the device. In that case, a circuit having the security function is normally formed in a so-called front end of line (FEOL) where elements such as an FET are formed on a semiconductor wafer. In conjunction with the miniaturization of wiring pitch typified by a recent wiring width of ten-odd nm, the design of semiconductor device and the fablessness of manufacturers, the elements (circuits) in the FEOL have been increasingly formed by specific external contract semiconductor manufacturers (specialized IC foundries) equipped with a semiconductor manufacturing process adapted to the miniaturization.

However, in that case, design information of the circuit having the security function flows out to the external contract semiconductor manufacturer, and the security function may be known to a third party including device imitators due to information leakage escaping through the non-disclosure agreement and the like. Moreover, the position of the circuit having the security function provided in the FEOL is easily identified, and its content is also likely to be easily analyzed.

On the other hand, in a back end of line (BEOL) formed above the FEOL, only a plurality of stacked wiring layers are usually provided, and the wiring pitch becomes wider toward an upper layer in order to enable connection with external terminals, and thus the above-described miniaturization process required in the FEOL is not needed in the BEOL. Note that, normally, some kind of function circuit other than the wiring layers is hardly provided in the BEOL.

International Publication WO2011/044385 discloses a chip identifier structure including at least two through silicon vias each wired to an external electrical connection, and a vertically stackable die (chip) having a chip identification decoding logic coupled to the chip identifier structure.

Chang-Hong Shen, et al. "Monolithic 3D Chip Integrated with 500 ns NVM, 3 ps Logic Circuits and SRAM" (9.3.1-9.3.4, Electron Devices Meeting (IEDM), 2013 IEEE International, 9-11 Dec. 2013) discloses a thin MOSFET formed in a back end of a three-dimensional stacked IC structure.

SUMMARY

In the invention described in International Publication WO2011/044385, the chip identifier structure is provided for identifying each of the stacked dies (chips) and is not provided in a specific layer in the BEOL. In addition, the invention described in Chang-Hong Shen, et al. "Monolithic 3D Chip Integrated with 500 ns NVM, 3 ps Logic Circuits and SRAM" (9.3.1-9.3.4, Electron Devices Meeting (IEDM), 2013 IEEE International, 9-11 Dec. 2013) discloses the thin MOSFET formed in the BEOL, but there is no disclosure about a circuit having a security function.

An object of the present invention is to provide an identifiable/traceable semiconductor device in which presence of a circuit (position and function thereof) having a security function incorporated in a BEOL is less specifiable.

One aspect of the present invention provides a semiconductor device comprising: a front end; and a back end including a plurality of layers, wherein a circuit having a security function is provided in at least one layer having a wiring pitch of 100 nm or more in the plurality of layers of the back end.

According to the semiconductor device in the one aspect of the present invention, a design andسales company of semiconductor device can form the circuit having a security function in any selected layer in the back end by using its own general-purpose semiconductor manufacturing process. Therefore, circuit information thereof is not leaked to outside, and the circuit can be made less specifiable and analyzable. As a result, identification and trace of the semiconductor device, specification of imitation products and the like can be performed without being known by device imitators and the like.

One aspect of the present invention provides a semiconductor device comprising: a front end; and a back end including a plurality of layers, wherein a circuit having a security function is provided in at least one wiring layer in M5 or higher level (M5, M6, M7, . . . ) in the plurality of layers of the back end.

According to the semiconductor device in the one aspect of the present invention, a design and sales company of semiconductor device can form the circuit having a security function in any selected wiring layer in M5 or higher level in the back end by using its own general-purpose semiconductor manufacturing process. Therefore, circuit information thereof is not leaked to outside, and the circuit can be made less specifiable and analyzable, and further, identification and trace of the semiconductor device, specification of imitation products and the like can be performed without being known by device imitators and the like.

One aspect of the present invention provides a semiconductor device comprising: a front end; and a back end including a plurality of layers, wherein a circuit having a security function is provided in at least one layer, for which immersion ArF exposure does not need to be used, in the plurality of layers of the back end.

According to the semiconductor device in the one aspect of the present invention, a design and sales company of semiconductor device can form the circuit having a security function in any selected wiring layer in the back end without using expensive immersion ArF exposure apparatus (process). Therefore, circuit information thereof is not leaked to outside, and the circuit can be made less specifiable and analyzable, and further, identification and trace of the semiconductor device, specification of imitation products and the like can be performed at comparatively low cost without being known by device imitators and the like.

One aspect of the present invention provides a semiconductor device comprising: a front end; and a back end including a plurality of layers, wherein a circuit having a security function is provided in at least one layer, which is exposed by using an exposure wavelength of 200 nm or more, in the plurality of layers of the back end.

According to the semiconductor device in the one aspect of the present invention, it is possible to form the circuit having a security function in any selected wiring layer in the back end without using a light source with a wavelength shorter than 200 nm, which is associated with an exposure process that requires large capital investment. Therefore, circuit information thereof is not leaked to outside and the circuit can be made less specifiable and analyzable, and further, identification and trace of the semiconductor device, specification of imitation products and the like can be performed at comparatively low cost without being known by device imitators and the like.

In the one aspect of the present invention, at least one layer of the back end of the semiconductor device can contain polycrystalline semiconductor (polycrystalline Si or polycrystalline Ge).

According to the semiconductor device in the one aspect of the present invention, by using a material whose characteristics are likely to vary such as polycrystalline Si or polycrystalline Ge, the circuit having a security function reflecting the variation in characteristics can be formed.

In the one aspect of the present invention, the security function of the semiconductor device can include at least one physically unclonable function (PUF) using variation in characteristics of semiconductor selected from a group including an arbiter PUF, a ring oscillator PUF, an SRAM PUF, and a butterfly PUF.

According to the semiconductor device in the one aspect of the present invention, a value peculiar to the semiconductor device can be obtained as an output value of an incorporated PUF circuit after manufacture, whereby identification and trace of the semiconductor device, specification of imitation products and the like can be performed.

DETAILED DESCRIPTION

Figure 1:
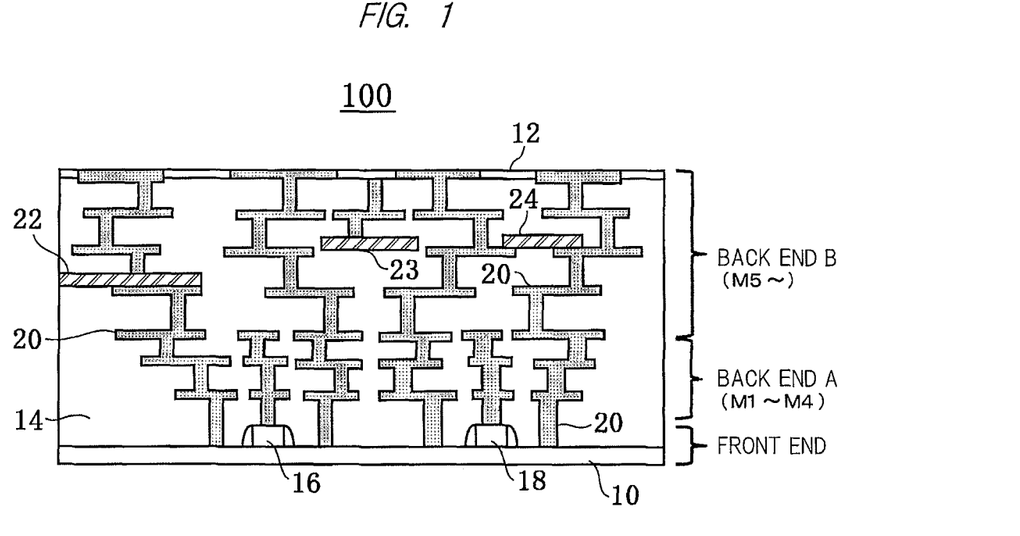
FIG. 1 is a sectional view showing a configuration of a semiconductor device according to an embodiment of the present invention.

An embodiment of the present invention will be described with reference to the drawings. FIG. 1 is a sectional view showing a configuration of a semiconductor device 100 according to an embodiment of the present invention. FIG. 1 shows a section of one semiconductor device or a section of a part of one semiconductor device, in other words, a section of a part of a semiconductor substrate (semiconductor wafer) before division or a section of one semiconductor device (chip) after division. A reference character 10 in FIG. 1 denotes a substrate (more precisely, a part of the substrate), and a plurality of stacked wiring layers 20 (including conductive vias) are formed in an insulating layer 14 on the substrate 10 toward an upper surface 12. As the semiconductor substrate, a substrate made of any semiconductor material including a group IV semiconductor such as Si or Ge, a group III-V compound semiconductor such as GaAs or GaN, and another compound semiconductor such as SiGe can be used.

The substrate 10 and a region in the vicinity of the substrate 10 indicate a so-called front end of line (FEOL), and a plurality of functional elements (circuit elements) including FETs 16 and 18 and the like are formed in the region. Hereinafter, the front end of line (FEOL) is simply referred to as front end. The elements (circuits) in the front end can be formed on the basis of a miniaturized wiring pitch typified by a recent wiring width of ten-odd nm (for example, 14 nm). The formation can be carried out in the state of a semiconductor wafer by specific external contract semiconductor manufacturers (specialized IC foundries) equipped with a semiconductor manufacturing process adapted to the miniaturization.

A region on the front end up to the upper surface 12 indicates a so-called back end of line (BEOL). As already described above, only a plurality of stacked wiring layers are usually provided, and the wiring pitch becomes wider toward an upper layer in order to enable connection with external terminals. Hereinafter, similarly, the back end of line (BEOL) is simply referred to as back end. In the embodiment of the present invention shown in FIG. 1, the back end is separated into a back end A of wiring levels from M1 to M4 and a back end B of wiring levels of M5 or higher (M5, M6, M7, . . . ) above the back end A.

The present invention focuses attention on the back end, and has one feature in providing a circuit having a security function (hereinafter, referred to as security function circuit) in the back end, to be more specific, in the back end B in FIG. 1. In FIG. 1, the security function circuit is arranged in each of regions (layers) denoted by reference characters 22, 23, and 24 in the back end B. The layers 22 and 24 are an example of a case of providing the security function circuit on a wiring layer, and the layer 23 is an example of a case of providing the security function circuit on an insulating layer. An output of the security function circuit can be acquired from a terminal or the like of the upper surface 12 via connected wiring in the back end. It is sufficient if at least one security function circuit is provided in one selected layer in the back end B, and two or more security function circuits of the same type or different types may be provided in the same layer or in different layers.

The layer in which the security function circuit is provided can contain polycrystalline semiconductor such as polycrystalline Si or polycrystalline Ge. The reason why the polycrystalline semiconductor is used is that the security function circuit of the embodiment of the present invention is intended to use variation in characteristics after manufacture of the semiconductor layer where the security function circuit is provided as described later in detail. Therefore, another semiconductor material (for example, amorphous Si) can be used as long as the material meets the intention and is formable in the back end. The security function circuit can be made of the semiconductor material, and can be manufactured by using functional elements such as thin film transistors (TFT) and elements such as resistors and capacitors by conventional semiconductor manufacturing techniques.

The security function circuit of the embodiment of the present invention can be provided not only in at least one layer in the wiring level of M5 or higher (M5, M6, M7, ... ) as described above, but also in at least one layer having a wiring pitch of 100 nm or more in the back end. Further, the security function circuit of the embodiment of the present invention can be provided in at least one layer, for which immersion ArF exposure does not need to be used, in the back end. Furthermore, the security function circuit of the embodiment of the present invention can be provided in at least one layer which is exposed by using an exposure wavelength of 200 nm or more.

The reason why the security function circuit of the embodiment of the present invention is provided in the at least one layer is that the circuit formation in the one layer does not need the miniaturization process that is required in the FEOL, and thus can be performed by using a so-called general-purpose semiconductor manufacturing process owned by a manufacturer. To be more specific, this is because a semiconductor device design company or manufacturer that has acquired a semiconductor wafer including the FEOL manufactured in a specific external contract semiconductor manufacturer can form the security function circuit as a part of a BEOL process by using its own so-called general-purpose semiconductor manufacturing process.

As a result, the design information of the security function circuit is not leaked to outside and the circuit is less easily specifiable and analyzable. Therefore, identification and trace of the semiconductor device, specification of imitation products and the like can be performed without being known by device imitators and the like.

Figure 2:
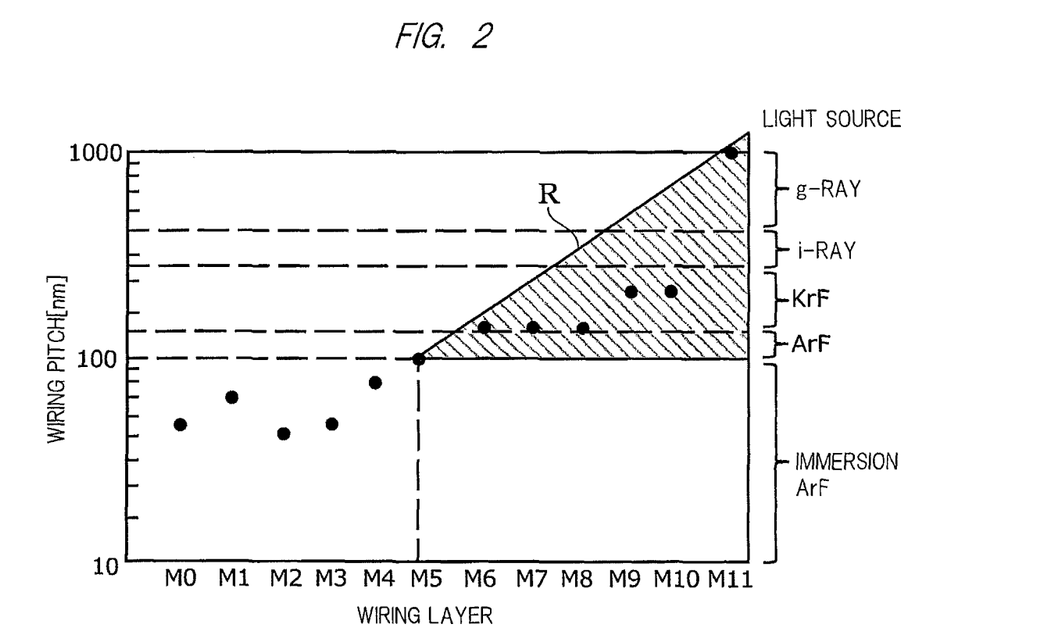
FIG. 2 is a diagram for describing a forming region of a circuit having a security function according to the embodiment of the present invention.
Figure 3:
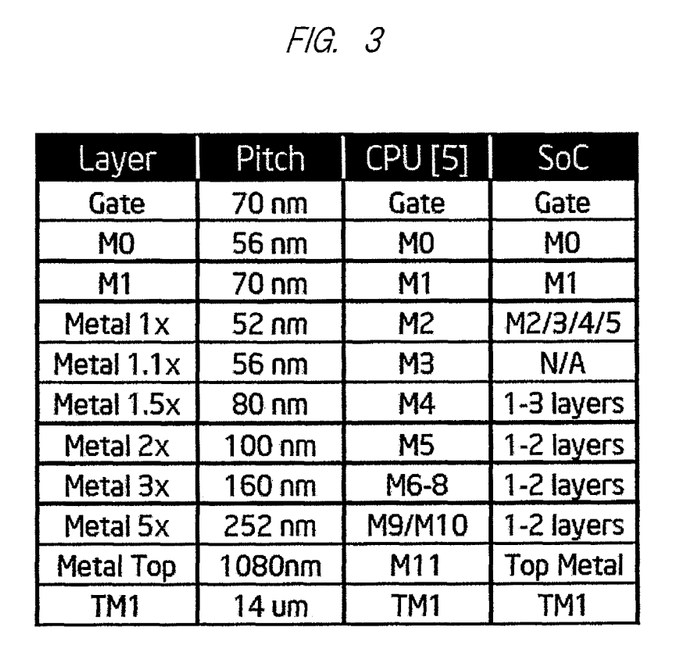
FIG. 3 is a diagram for describing a relationship between a wiring layer and a wiring pitch.
Figure 4:
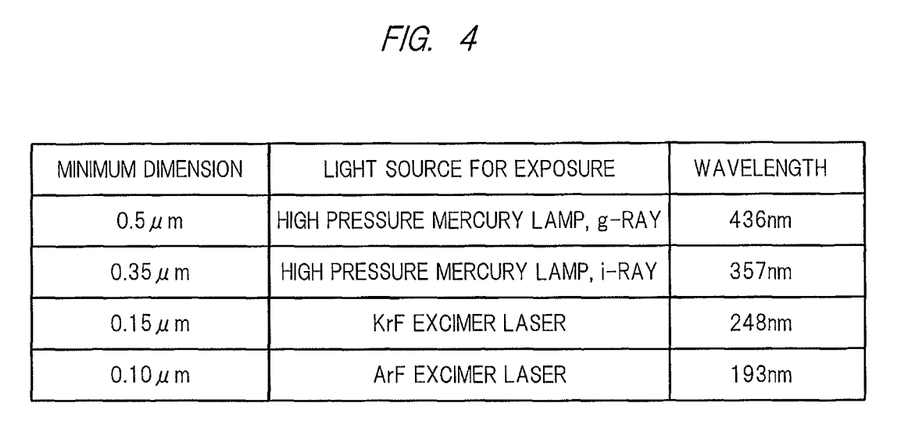
FIG. 4 is a diagram for describing a relationship among a light source, a wavelength, and a resolution at the time of exposure.

At least one layer in the back end in which the security function circuit of the embodiment of the present invention is provided will be described with reference to FIGS. 2 to 4. FIG. 2 is a diagram for describing a forming region of the circuit having the security function according to the embodiment of the present invention. In other words, FIG. 2 shows a relationship among a wiring layer, a wiring pitch, and an exposure light source/technique. FIG. 3 is a diagram for describing a relationship between the wiring layer (Layer) and the wiring pitch (Pitch). FIG. 3 shows the latest BEOL wiring design rule at the pitch of 14 nm in the FEOL published by Intel Corporation. It is found from FIG. 3 that even the latest pitch of 14 nm has the wiring pitch of 100 nm or more in the wiring level of M5 or higher. FIG. 4 is a diagram for describing a relationship among an exposure light source, a wavelength, and a resolution (minimum dimension).

It is found that the wiring pitch (nm) becomes larger as the level of the wiring layer rises from M0 to M11 from FIG. 2, and a light source (g-ray, i-ray, KrF, or the like) having a comparatively long wavelength (200 nm or more) can be used as the exposure light source from the relationship between the exposure light source and the wavelength in FIG. 4. In the embodiment of the present invention, a region R surrounded by a triangle in FIG. 2 is selected as a region where the security function circuit is provided. A layer in this region R has above-described characteristics that the level of the wiring layer is M5 or higher, the wiring pitch is 100 nm or more, immersion ArF does not need to be used as the exposure light source/technique, and the exposure wavelength is about 200 nm or more.

Here, the immersion ArF exposure is a technique using a fact that exposure light (ArF excimer laser light) is shortened in wavelength in an immersed image space, instead of shortening the wavelength of the light source like the conventional exposure using an ArF excimer laser or the like. In the immersion ArF exposure, light having a wavelength of about 134 nm can be obtained on the one hand, but an expensive exposure apparatus including an immersion liquid supply mechanism and the like is required on the other hand. The exposure without using the immersion ArF exposure can be carried out by a comparatively inexpensive general-purpose exposure apparatus, and thus can be carried out by a semiconductor device design company or manufacturer in its own so-called general-purpose semiconductor manufacturing process.

Next, examples of the security function circuit according to the embodiment of the present invention will be described with reference to FIGS. 5 to 8. FIGS. 5 to 8 show examples of a circuit in which a physically unclonable function (PUF) using variation in characteristics of semiconductor is utilized as a security function circuit. Here, using variation in characteristics of semiconductor means forming a security function circuit by using a material whose characteristics are likely to vary such as a polycrystalline semiconductor layer shown in FIG. 1.

In a case of using the PUF circuit as the security function circuit, an output of the PUF circuit individually (for each device (chip)) differs due to variations in device characteristics after (at the time of) manufacture including variation in characteristics of the semiconductor layer in which the PUF circuit is provided. In the embodiment of the present invention, the change (difference) in the output of the PUF circuit is utilized for the device identification. Note that the examples in FIGS. 5 to 8 are shown by way of examples, and other PUF circuits or other types of security function circuits may also be used.

Figure 5:
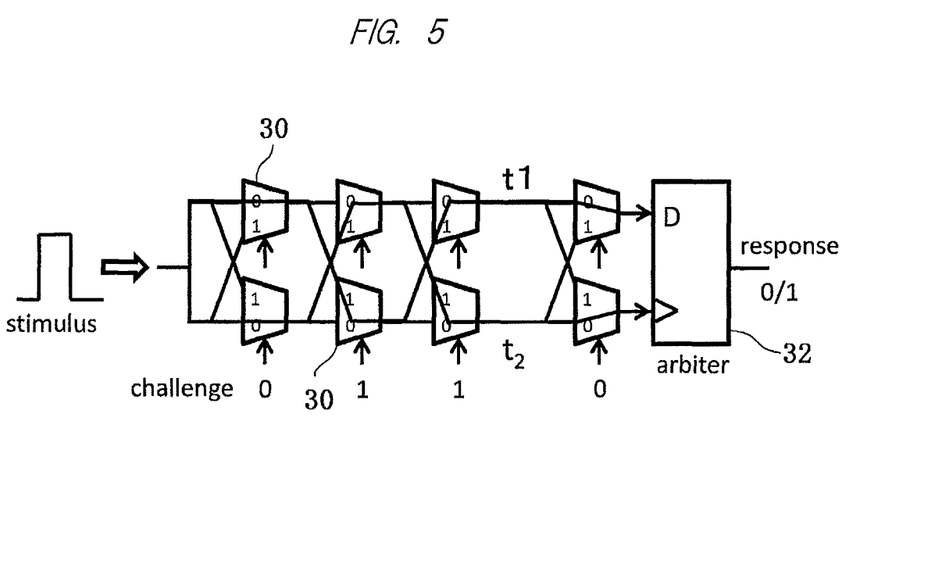
FIG. 5 is a diagram showing a configuration of the circuit having the security function according to the embodiment of the present invention.

FIG. 5 shows an example of utilizing an arbiter PUF as the PUF circuit. In the example of FIG. 5, an output of an arbiter circuit 32 changes between 0(L) and 1(H) according to a delay amount $\Delta t = t_1 - t2$ in outputs of two rows of selectors 30. The delay amount $\Delta t = t1 - t2$ differs depending on device characteristics including characteristics of the semiconductor material in which the circuit is provided. As a result, by measuring and recording the output value (0 or 1) in advance after manufacturing the device, it is possible to specify a genuine product from which the output value can be obtained, and also possible to specify an imitation product from which the output value cannot be obtained, when imitation products and the like are discovered afterward.

Figure 6:
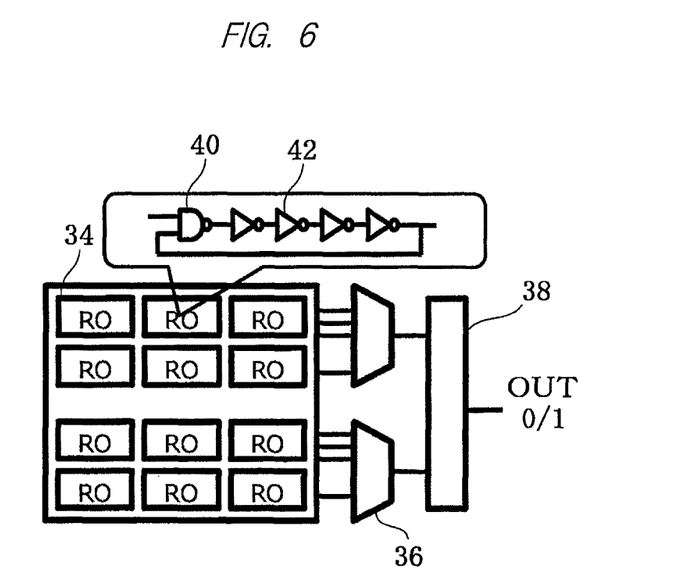
FIG. 6 is a diagram showing a configuration of the circuit having the security function according to the embodiment of the present invention.

FIG. 6 shows an example of utilizing a ring oscillator (RO) PUF as the PUF circuit. The PUF circuit in FIG. 6 includes a plurality of ROs 34, a selector 36, and a comparator 38. Each of the ROs 34 includes an AND gate 40 and inverters 42 connected in series. In FIG. 6, the comparator 38 determines which one of outputs of the two ROs 34 selected by the selector 36 is faster (difference in the outputs) and outputs the difference (0 or 1). An oscillation frequency of the RO differs depending on device characteristics including characteristics of the semiconductor material in which this circuit is provided. As a result, by measuring and recording the output value (0 or 1) in advance after manufacturing the device, it is possible to trace a genuine product and specify an imitation product afterward, as in the case of the PUF circuit in FIG. 5.

Figure 7:
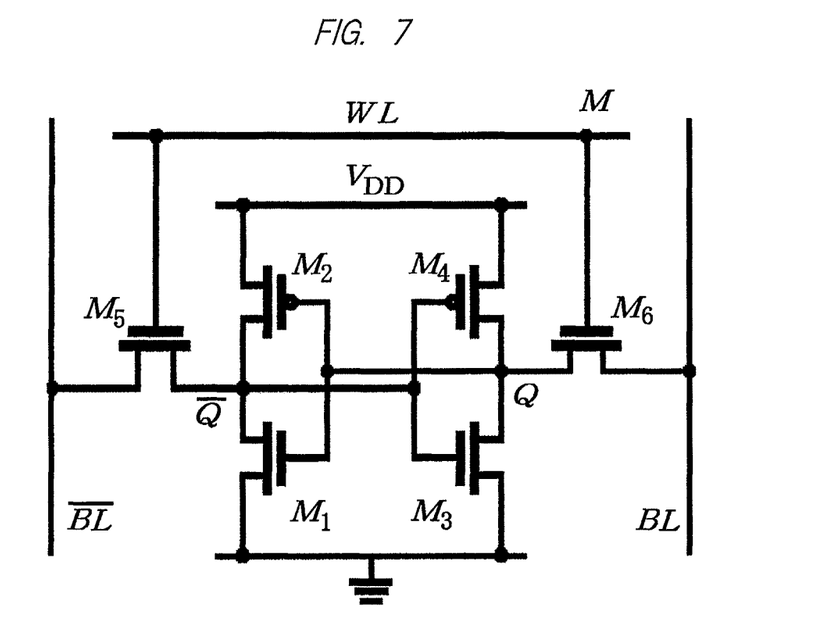
FIG. 7 is a diagram showing a configuration of the circuit having the security function according to the embodiment of the present invention.

FIG. 7 shows an example of utilizing an SRAM PUF as the PUF circuit. FIG. 7 shows a configuration of a typical SRAM circuit (cell). An initial value of an SRAM cell at power-on, that is, an output value (0 or 1) of a bit line (BL, /BL) is used as an identifier of the device. Whether the output value of the SRAM cell after power-on becomes 0 or 1 is determined depending on variation in device characteristics including characteristics of the semiconductor material in which the cell is provided, and it is difficult to predict the output value before manufacture. By measuring and recording the output value (0 or 1) in advance after manufacture of the SRAM circuit (cell), it is possible to trace a genuine product and specify an imitation product afterward, as in the cases of the PUF circuits in FIGS. 5 and 6.

Figure 8:
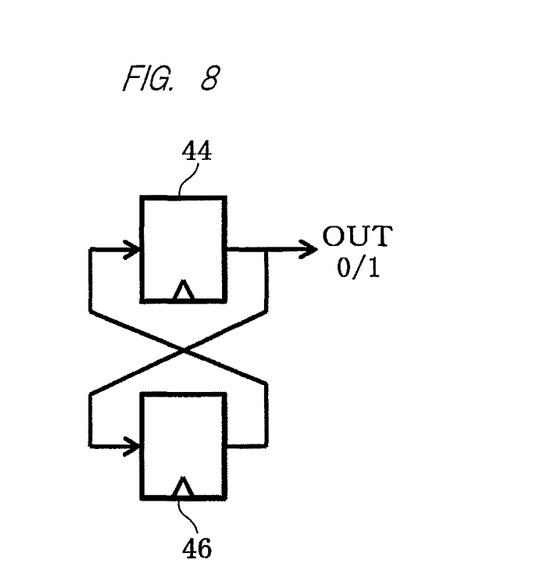
FIG. 8 is a diagram showing a configuration of the circuit having the security function according to the embodiment of the present invention.

FIG. 8 shows an example of utilizing a butterfly PUF as the PUF circuit. In the PUF circuit in FIG. 8, initial values of interconnected flip-flops (FF) 44 and 46 are used as identifiers of the device. Whether an output (OUT) after power-on or after reset becomes 0 or 1 is determined depending on variation in device characteristics including characteristics of the semiconductor material in which the circuit is provided, and it is difficult to predict the output before manufacture. By measuring and recording the output value (0 or 1) in advance after manufacture, it is possible to trace a genuine product and specify an imitation product afterward, as in the cases of the PUF circuits in FIGS. 5 to 7.

The embodiment of the present invention has been described with reference to the drawings. However, the present invention is not limited to the embodiment. Further, the present invention can be implemented in aspects in which various improvements, modifications, and deformations are made on the basis of the knowledge of those skilled in the art without departing from the spirit of the present invention.

The semiconductor device of the present invention can be basically used as a device having a security function in semiconductor devices for any use such as a general-purpose IC (LSI), various custom ICs, a game IC whose imitation products are likely to get into circulation, and a nonvolatile semiconductor memory.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A semiconductor device comprising:
   a front end; and
   a back end including a plurality of layers, wherein a circuit having a security function is provided in at least one layer having a wiring pitch of 100 nm or more in the plurality of layers of the back end, and
   wherein the security function includes a physically unclonable function (PUF) using variation in characteristics of a semiconductor layer of the semiconductor device for outputting a genuine product value.

2. The semiconductor device according to claim 1,
   wherein the at least one layer contains polycrystalline semiconductor.

3. The semiconductor device according to claim 2,
   wherein the polycrystalline semiconductor includes polycrystalline Si or polycrystalline Ge.

4. The semiconductor device according to claim 1,
   wherein the PUF includes at least one selected from an arbiter PUF, a ring oscillator PUF, an SRAM PUF, and a butterfly PUF.

5. A semiconductor device comprising:
   a front end; and
   a back end including a plurality of layers,
   wherein a circuit having a security function is provided in at least one wiring layer in M5 or higher level (M5, M6, M7, . . . ) in the plurality of layers of the back end, and
   wherein the security function includes a physically unclonable function (PUF) using variation in characteristics of a semiconductor layer of the semiconductor device for outputting a genuine product value.

6. The semiconductor device according to claim 5,
   wherein the at least one layer contains polycrystalline semiconductor.

7. The semiconductor device according to claim 6,
   wherein the polycrystalline semiconductor includes polycrystalline Si or polycrystalline Ge.

8. The semiconductor device according to claim 5,
   wherein the PUF includes at least one selected from an arbiter PUF, a ring oscillator PUF, an SRAM PUF, and a butterfly PUF.

9. A semiconductor device comprising:
   a front end; and
   a back end including a plurality of layers,
   wherein a circuit having a security function is provided in at least one layer, for which immersion ArF exposure is not used, in the plurality of layers of the back end, and
   wherein the security function includes a physically unclonable function (PUF) using variation in characteristics of a semiconductor layer of the semiconductor device for outputting a genuine product value.

10. The semiconductor device according to claim 9,
    wherein the at least one layer contains polycrystalline semiconductor.

11. The semiconductor device according to claim 10,
    wherein the polycrystalline semiconductor includes polycrystalline Si or polycrystalline Ge.

12. The semiconductor device according to claim 9,
    wherein the PUF includes at least one selected from an arbiter PUF, a ring oscillator PUF, an SRAM PUF, and a butterfly PUF.

13. A semiconductor device comprising:
    a front end; and
    a back end including a plurality of layers,
    wherein a circuit having a security function is provided in at least one layer, which is exposed by using an exposure wavelength of 200 nm or more, in the plurality of layers of the back end, and wherein the security function includes a physically unclonable function (PUF) using variation in characteristics of a semiconductor layer of the semiconductor device for outputting a genuine product value.

14. The semiconductor device according to claim 13,
    wherein the at least one layer contains polycrystalline semiconductor.

15. The semiconductor device according to claim 14,
    wherein the polycrystalline semiconductor includes polycrystalline Si or polycrystalline Ge.

16. The semiconductor device according to claim 13, wherein the PUF includes at least one selected from an arbiter PUF, a ring oscillator PUF, an SRAM PUF, and a butterfly PUF.

\* \* \* \* \*